A. SCHROEDER.
ENGINEER'S COMBINATION ROD.
APPLICATION FILED SEPT. 26, 1910.
1,029,470.
Patented June 11, 1912.
3 SHEETS—SHEET 1.
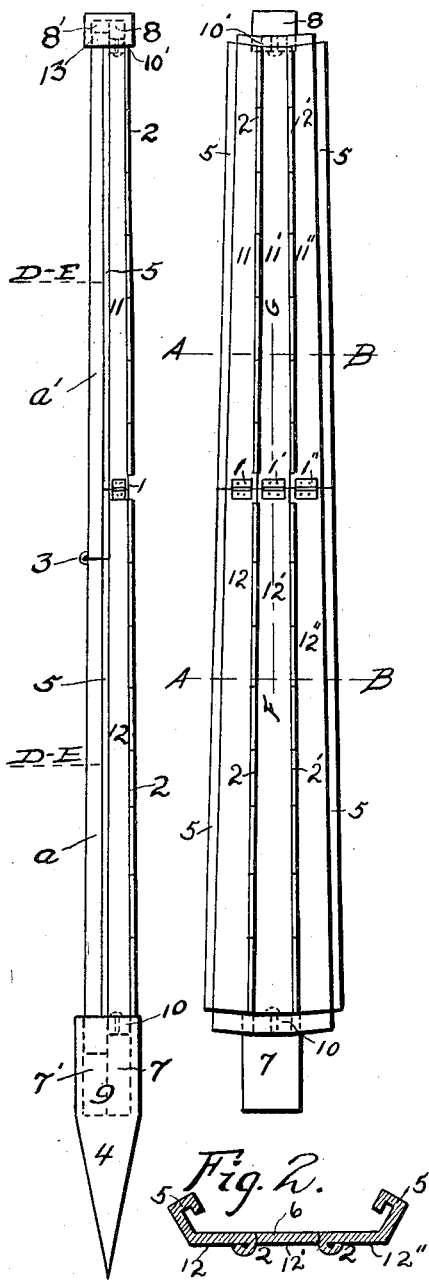
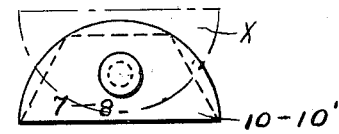
Fig. 4.
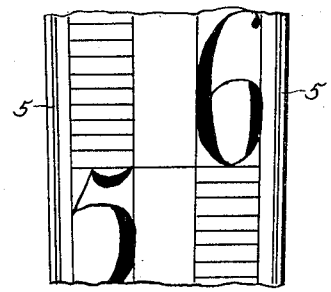
Fig. 5.
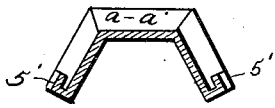
Fig. 6.
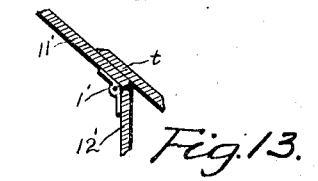
Fig. 13.
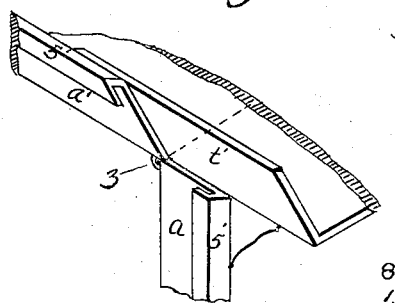
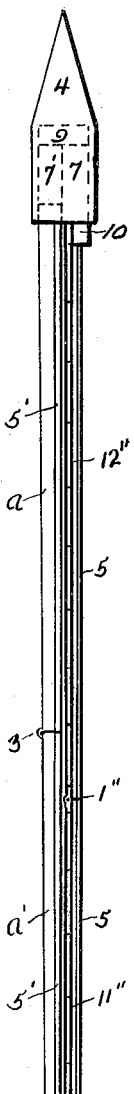
Fig. 1. Fig. 2. Fig. 3. Fig. 8. Fig. 7.
WITNESSES:
Losh O. Harbaugh
John J. Thompson
INVENTOR.
Albert Schroeder

A. SCHROEDER.
ENGINEER'S COMBINATION ROD.
APPLICATION FILED SEPT. 26, 1910.

1,029,470.

Patented June 11, 1912.

3 SHEETS—SHEET 2.

WITNESSES:
Lash O. Harbaugh
John J. Thompson

INVENTOR.
Albert Schroeder

A. SCHROEDER.
ENGINEER'S COMBINATION ROD.
APPLICATION FILED SEPT. 26, 1910.

1,029,470.

Patented June 11, 1912.
3 SHEETS—SHEET 3.

Witnesses
Thomas D. McClay
Losh O. Harbaugh

Inventor
Albert Schroeder

UNITED STATES PATENT OFFICE.

ALBERT SCHROEDER, OF PIQUA, OHIO.

ENGINEER'S COMBINATION-ROD.

1,029,470.
Specification of Letters Patent.
Patented June 11, 1912.

Application filed September 26, 1910. Serial No. 583,972.

*To all whom it may concern:*

Be it known that I, ALBERT SCHROEDER, a citizen of the United States, residing at Piqua, in the county of Miami and State of Ohio, have invented certain new and useful Improvements in Engineers' Combination-Rods, of which the following is a specification, reference being had to the accompanying drawings, forming a part thereof.

The main objects of my invention are, to provide a rod that engineers may use as a flag-pole; with slight changes as a leveling rod; with slight changes as a plummet lamp; with slight changes as a plumb-bob and to provide the same with a target enabling the same to be used at any time during day or night.

It consists in certain novel construction, combination and arrangement of parts, as hereinafter specially described and particularly pointed out in the claims.

I attain these objects by the mechanism illustrated in the accompanying drawings in which characters of reference designate the same parts in the several figures, and in which drawings:—

Figure 9:
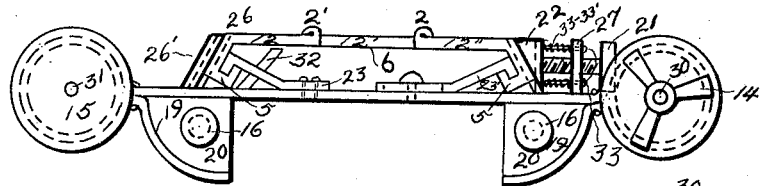
Figure 10:
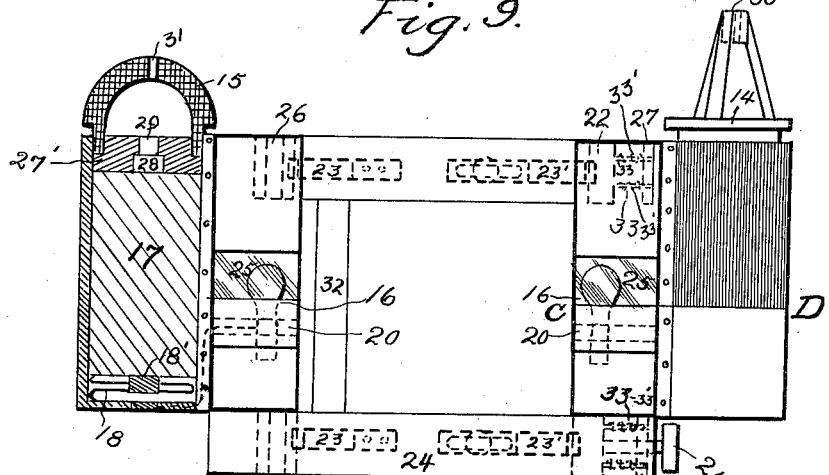
Figures 11, 12, 14:
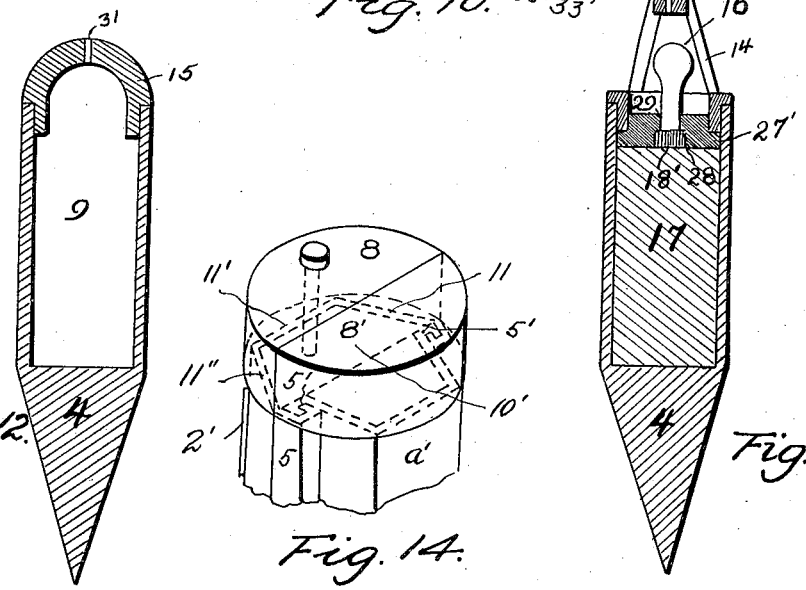
Figure 15:
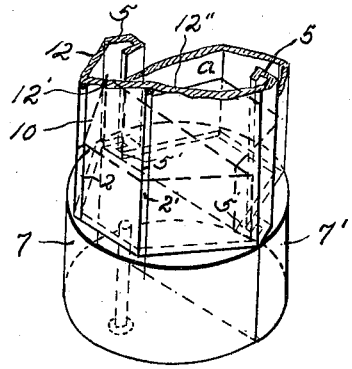
Figure 16:
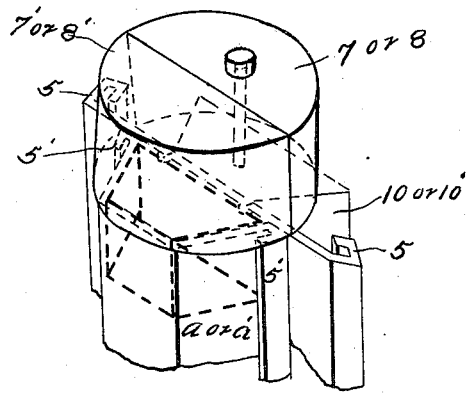
Figure 17:
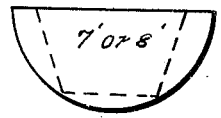
Figure 17:
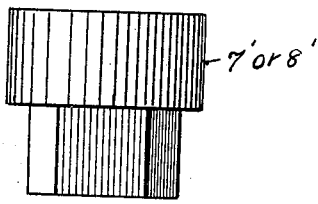
Figure 18:
Figure 18:
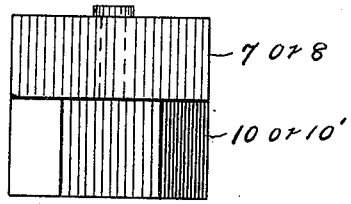
Figure 19:
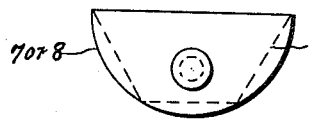
Figure 19:
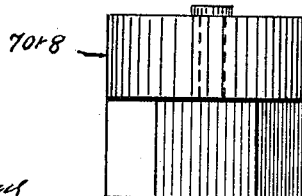

Figure 1 is an elevation view of a hollow hexagonal flag pole; Fig. 2 is one-half of the flagpole in a flattened position showing the side connections; Fig. 3 is a sectional view of Fig. 2 taken on either line A.—B. Fig. 4 is a plan view of the half slip or screw-head 7 and the half slip or screw head 8 in reverse positions; Fig 5 is an elevation view of the inside surface of a section of Fig. 2. Fig. 6 is a sectional view of Fig. 1 taken on either one of the lines D., E being one half of the flag pole. Fig. 7 is a side elevation view of Fig. 1 mounted as a leveling rod. Fig. 8 is a section at the middle of Fig. 1 showing the rod in a broken position. Fig. 9 is a plan view of the electric target and attachments mounted on the rod. Fig. 10 is an elevation view of the target. Fig. 11 is a sectional view of the shoe arranged as a plummet lamp. Fig. 12 is a sectional view of the shoe arranged as a plumb-bob. Fig. 13 is a sectional view of part 11' and part 12' taken on the line F.—G. in Fig. 2. Fig. 14 is a detailed view of half slip or screw-heads 8 and 8' showing their connections to 11' and $a'$ respectively. Fig. 15 is a detailed view of the half slip or screw heads 7 and 7' showing their connections to 12' and $a'$ respectively. Fig. 16 is a perspective view of a portion of either end of the leveling rod. Fig. 17 is an elevation and a plan view of either half screws or slip heads 7' or 8'. Fig. 18 is a plan and an elevation view of 7 or 8 and of 10 or 10'. Fig. 19 is a plan and an elevation view of 7 or 8 and of 10 or 10' with the screw or slip heads arranged for the flag pole.

11 and 12 form one side of a hexagonal flag pole or leveling rod and are joined end to end by means of the hinge 1, the hinge 1 is to permit 11 to fold down over part 12, 11' and 12' form one side of a hexagonal flag pole or leveling rod and are joined end to end by means of the hinge 1', the hinge 1' is to permit the part 11' to fold down over part 12', $t$ is rigidly fastened to 11' and extends down beyond the upper end of 12' as shown in the Fig. 13, in order to give greater strength to the flag pole or the leveling rod when 11' and 12' form a straight angle and to prevent the hinge 1' from breaking, 11'' and 12'' form one side of a hexagonal flag pole or leveling rod and are joined end to end by means of the hinge 1'', the hinge 1'' permits part 11'' to fold down over part 12'', 11 and 11', and 12 and 12' are laterally joined together by means of the vertical hinge 2, 11' and 11'' and 12' and 12'' are laterally joined together by means of the hinge 2', the hinges 2 and 2' permit the three faces 11 and 12, 11' and 12' and 11'' and 12'' to fold vertically over each other. The loose edges of 11 and 12, and of 11'' and 12'' are provided with flanges 5.

$a$ is a flat piece of metal bent vertically into three faces and forms the upper part of one half of the hexagonal flag pole or leveling rod.

$a'$ is a flat piece of metal bent vertically into three faces and forms the lower part of one half of the hexagonal flag pole or leveling rod.

A and A' are joined end to end by means of the hinge 3. The hinge 3 permits A to fold down over A'. A and A' joined as described, form the remaining three sides of the hexagonal flag pole or leveling rod. The lateral edges of A. and A' are provided with flanges 5'. The flanges 5' are pushed up through the flanges 5 and in this manner the six sides of a very rigid and firm hexagonal flag pole are joined.

10' is a hexagonal shoulder rigidly and firmly fastened to the upper end of 11' and has 8 swiveled thereto, by means of the pin 8ª.

10 is a hexagonal shoulder rigidly and firmly fastened to the lower end of 12′ and has 7 swiveled thereto, by means of the pin 7ᵃ. 8′ is rigidly and firmly fastened to the upper end of the middle face of A′, 7′ is rigidly and firmly fastened to the lower end of the middle face of A.

8 and 8′ are the halves and complements of a slip or screw head at the upper end of the flag pole, 8 is swiveled to 10′ so as to revolve to any desired position.

13 is a slip or screw cap fitting down over 8 and 8′.

7 and 7′ are the halves and the complements of a slip or screw head at the lower end of the flag pole. 7 is swiveled to 10 so as to revolve to any desired position.

4 is a slip or screw shoe fitting up over the lower end of the flag pole. The shoe 4 fits up over the ends of 12, 12′ and 12″ and A thus assuring a firmness to the lower end of the pole, 13 fits down over the ends of 11, 11′ and 11″ and A′ thus assuring a firmness to the upper end of the pole. The hinges 1, 1′ and 1″ are not in the same horizontal plane with the hinge 3 but are staggered giving greater strength to the flag pole.

The above construction forms a very rigid and firm flag pole. The cap 13 is unscrewed or slipped off from the screw or slip head composed of 8 and 8′ and the shoe 4 is unscrewed or slipped off from the screw or slip head composed of 7 and 7′ and the two halves, taken vertically, of the flag pole or leveling rod are separated. After removing the cap 13 and the shoe 4, 11, 11′ and 11″, and 12, 12′ and 12″ are rotated on their vertical hinges 2 and 2′ to such position that their inside surfaces form one flat surface 6. The surface 6 is provided with graduations to determine levels as shown in Fig. 5 as the surface 6 is formed 8 and 7 are swiveled one-half of a revolution so that their flat surfaces fit against the flat surfaces of 8′ and 7′ respectively as are shown by X in Fig. 4. a and a′ forming a straight angle fit closely to the back portion of 11, 11′ and 11″, 12, 12′ and 12″. The cap 13 is then again slipped or screwed down over 8 and 8′ and the shoe 4 is again slipped or screwed down over 7 and 7′. The contrivance thus formed is inverted and forms a very stiff and firm leveling rod. In order that the leveling rod may be used under any and all conditions of the weather and at any and all times of the day and night the leveling rod is provided with a target.

24 is the metal frame of the target.

32 is a vernier extending in from the frame 24 toward the face 6.

16 and 16′ are electric globes securely fastened into the frame 24 and are for the purpose of lighting the graduation and the vernier 32 and also for illuminating the transparent windows 25. 20 and 20′ are non-conducting pedestals for holding 16 and 16′ respectively. 19 and 19′ are reflectors so constructed and arranged that the light from 16 and 16′ is at all times reflected on said graduation as shown in Fig. 5 and on the vernier 32. The target is provided with an enameled face, that part above the line C—D being in red and that part below the line C—D being in white as indicated by the shading in the Fig. 10.

17 and 17′ are electric batteries fastened into the frame 24.

18′ are conductors in duplicate conducting currents from the batteries 17 and 17′ to the globes, 16 and 16′ respectively.

18 are springs in duplicate to prevent connection between 16 and 18′ respectively except when the elasticity of the springs 18 in duplicate is overpowered by the screwing of the caps 14 and 15 down into the frame 24. 27′ are in duplicate and form the cushions for the batteries 17 and 17′ respectively.

29 is an aperture in the cushion 27′ into which the globe 16 is screwed.

26 and 26′ are those portions of the frame 24 which fit closely against one of the flanges 5.

22 and 22′ are metal blocks which fit closely against the back of the opposite flanges 5.

21 is a screw which works through plate 27.

33 are guides for the plate 27.

33′ are coiled springs working over and around the guides 33. As the screw 21 is turned and because of the springs 33′ the plate 22 is caused to press more closely to the flanges 5 thus fastening the target more firmly to the leveling rod.

23 and 23′ are hooks in duplicate working up and down over the leveling rod. The hooks 23 are fastened rigidly to the target but when the springs 33 and 33′ are released, are free to move up and down on leveling rod, 23′ are either loose or tight on both the target and the leveling rod according to the springs taking up the play on the leveling rod.

The battery 17 in an inverted position may be removed from the target and placed in the receptacle 9 of the shoe 4, the cap 14 is then screwed down into the shoe 4 and the globe 16 is screwed in the frame part of cap 14 down through the receptacle 29′ of the cushion 27′. Connection 18′ slips into the aperture 28 and the connection between 17 and the globe 16 causes light. In this manner shoe 4 forms a plummet lamp. 30 is a ring hole through which a cord passes for the purpose of hanging up the plummet lamp. The cap 14 and the battery 17 with its connections are removed and cap 15 is screwed down into shoe 4. A cord is attached in ring hole 31. In this manner shoe 4 forms a plumb-bob.

The manner of constructing the above said mechanism may be described as follows: Hinge the parts 11 and 12 end to end by means of the hinge 1; hinge the parts 11' and 12' end to end by means of the hinge 1'; connect 11 and 12 thus hinged, to 11' and 12' by means of the lateral hinge 2; hinge the parts 11'' and 12'' end to end by means of the hinge 1''; connect 11'' and 12'' thus hinged, to 11' and 12' by means of the hinge 2'; rotate 11 and 12, 11' and 12' and 11'' and 12'' on their vertical hinges 2 and 2' to such an extent that the said three sides form one half of a hexagonal flag pole. Hinge the parts A and A' end to end by means of hinge 3. The hexagonal shoulder 10' is rigidly riveted to the upper end of 11'. The one half slip or screw head 8 is swiveled through said hexagonal shoulder 10'. The hexagonal shoulder 10 is rigidly riveted to the lower end of 12' and the one half slip or screw head 7 is swiveled through said hexagonal shoulder 10. The one half slip or screw head 8' is rigidly riveted to the upper end of the middle face of A. The slip or screw head 7' is rigidly riveted to lower end of middle face of A'. Now push the flanges 5' of A and A' up through the flanges 5 until the end of A' is flush with the ends of 12, 12' and 12''. The one half slip or screw head 8 is the complement of the one half slip or screw head 8', and the one half slip or screw head 7 is the complement of the one half slip or screw head 7'. Screw or slip the cap 13 down over the slip or screw head composed of 8 and 8' and slip or screw the shoe 4 down over the slip or screw head composed of 7 and 7'. The above construction forms a hexagonal flag pole. Slip off or unscrew the cap 13, slip off or unscrew the shoe 4 and pull flanges 5' from out of flanges 5. The flag pole is then disassembled. Rotate 11 and 12, 11' and 12' and 11'' and 12'' on their vertical hinges 2 and 2' to such position that their combined inner surfaces are all in one common plane and form the surface 6. Then place A and A' forming a straight angle, against the back surface of 11 and 12, 11' and 12' and 11'' and 12''. Rotate 8 in its swivel to such position that its flat surface fits against the flat surface of 8'. Rotate 7 in its swivel to such position that its flat surface fits against the flat surface of 7'. In this position again slip or screw the cap 13 down over the slip or screw head composed of 8 and 8' and slip or screw the shoe 4 down over the slip or screw head composed of 7 and 7'. The construction as last described forms a leveling rod. Slip the frame 24 down over the leveling rod and tighten the screws 21 and screw down the caps 14 and 15 and the leveling rod is lighted so that it may be employed in dark places. Remove the shoe 4 and place the battery 17 therein, place the globe 16 in the cap 14 and screw the cap 14 down into the shoe 4 and the device is employed as a plummet lamp.

Having fully described my invention and specified the distinctive features and objects thereof, now as new, novel and useful, I claim:

1. An engineer's rod of substantially hexagonal form comprising two interlocking members, one member consisting of three parts forming the three faces of a hexagon, hinged together at their adjacent sides, each part having an upper and a lower section hinged together, the other member consisting of a single part bent to form the other three faces of the hexagon, the said part having an upper and a lower section hinged together, and flanges on the edges of the two members adapted to lock the two members together to form a flag pole, substantially as described.

2. An engineer's rod of substantially hexagonal form comprising two interlocking members, one member consisting of three parts forming the three faces of a hexagon, hinged at their adjacent sides, each part having an upper and a lower section hinged together, a hexagonal shoulder, said hexagonal shoulder being riveted to the lower end of the lower section of the middle part of said one member, a half screw head, said half screw head being swiveled into said hexagonal shoulder, the other member consisting of a single part bent to form the other three faces of the hexagon, the said part having an upper and a lower section hinged together, a second half screw head the complement of said first half screw head, said second half screw head being rigidly fastened to the lower end of the lower section of said other member, flanges, said flanges being on the edges of the two members adapted to lock the two members together, a shoe having a receptacle, said shoe being smooth or having screw threads on the inner surface of its receptacle, said shoe screwing up over said first and second half screws, the walls of said shoe extending up over the lower ends of said two interlocking members, holding said two interlocking members firmly to said hexagonal shoulder for the purpose of making a very firm hexagonal flag pole, substantially as described.

3. An engineer's rod of substantially hexagonal form comprising two interlocking members, one member consisting of three parts forming the three faces of a hexagon, hinged at their adjacent sides, each part having an upper and a lower section hinged together, a second hexagonal shoulder, said second hexagonal shoulder being riveted to the upper end of the upper section of the middle face of said one member, a third half screw head, said third half screw head being swiveled into said second hexagonal shoulder, the other member consisting of a single part bent to form the other three faces of the hexagon, a fourth half screw head the complement of said third half screw head, said fourth half screw head being rigidly fastened to the upper end of the upper section of said other member, flanges, said flanges being on the edges of the two members adapted for locking the two members together, a cap, said cap having a receptacle, screw threads, said screw threads being on the inner surface of said receptacle, said cap screwing down over said third and fourth half screw heads, the walls of said cap extending down over the upper ends of said two interlocking members, holding said two interlocking members firmly to said second hexagonal shoulder for the purpose of making a very firm flag pole, substantially as described.

4. An engineer's rod including a leveling rod comprising two members, one member consisting of three parts, hinged at their adjacent sides, each part having an upper and a lower section hinged together, a hexagonal shoulder, said hexagonal shoulder being riveted to the lower end of the lower section of the middle face of said one member, a half screw head, said half screw head being swiveled into said hexagonal shoulder, a second hexagonal shoulder, said second hexagonal shoulder being riveted to the upper end of the upper section of the middle face of said one member, a third half screw head, said third half screw head being swiveled into said second hexagonal shoulder, the other member consisting of a single part bent to form three faces of a hexagon, having an upper and a lower section hinged together, a second half screw head and the complement of said first half screw head, said second half screw head being rigidly fastened to the lower end of the lower section of said other member, a fourth half screw head, said fourth half screw head being rigidly fastened to the upper end of the upper section of said other member and forming the complement of said third half screw head, a shoe, said shoe screwing up over said first and second half screw heads, a cap, said cap screwing down over said third and fourth half screw heads, substantially as described.

5. An engineer's rod including a leveling rod having flanges on its lateral edges, and a target consisting of a frame, said frame being adjustably attached to said leveling rod by means of two sets of hooks, one set being rigidly fastened to said frame, the other set fitting over said frame, the two sets fitting into the flanges of the leveling rod, flanges in duplicate, said flanges being rigidly fastened to said frame and extending out over and fitting against the flanges of the leveling rod, blocks in duplicate, said blocks fitting closely to the flanges of the leveling rod, a plate, guides, the guides connecting said plate and one of said blocks, a screw, said screw connecting said plate and one of said blocks, springs in duplicate, said springs fitting and working over said guide, substantially as described.

6. An engineer's rod, including a leveling rod and a target consisting of a frame and target members, said frame being adjustably attached to said leveling rod and having a receptacle on each side of the leveling rod, a face, said face being part in red and part in white, a vernier, windows, reflectors, said target members comprising batteries in duplicate, cushions in duplicate, non-conducting pedestals, light globes, conductors in duplicate, springs in duplicate, and caps in duplicate, said members being so proportioned that when fitted together and placed in said frame they form a target for lighting the leveling rod for reading purposes, substantially as described.

7. In an engineer's rod, a shoe for supporting the rod having a receptacle in its upper part, and a target member comprising a battery, a cushion, a conductor, a light globe, and a cap, such parts being so proportioned that when fitted together they form a plummet lamp, said cap having an aperture to receive a cord, substantially as described.

8. An engineer's rod of substantially hexagonal form comprising two interlocking members, one member consisting of three parts forming the three faces of a hexagon, hinged together at their adjacent sides, each part having an upper and a lower section hinged together for the purpose of permitting the upper sections folding down over the lower sections of said one member, the other member consisting of a single part bent to form the other three faces of the hexagon, having an upper and a lower section hinged together for the purpose of folding the upper down over the lower section, the hinging and the folding of the said two members being for the purpose that the rod may be handled more easily when not in use, and the hinging of the upper and the lower sections of said two members being staggered for the purpose of giving strength to the rod, substantially as described.

ALBERT SCHROEDER.

Witnesses:
JOHN J. THOMPSON,
LASH O. HARBAUGH.

Copies of this patent may be obtained for five cents each, by addressing the "Commissioner of Patents, Washington, D. C."